Figure 1:
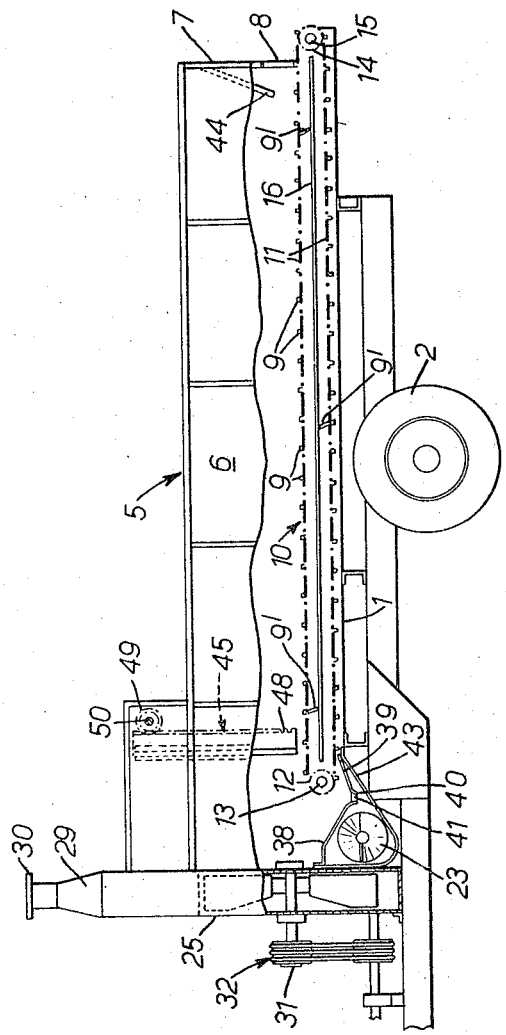

Feb. 28, 1967  N. FINCH  3,306,673
CROP-HANDLING VEHICLES
Filed July 6, 1965  3 Sheets-Sheet 1

INVENTOR
NIGEL FINCH
BY Young + Thompson
ATTORNEYS

Feb. 28, 1967　　　　　N. FINCH　　　　　3,306,673
CROP-HANDLING VEHICLES
Filed July 6, 1965　　　　　　　　　　　　3 Sheets-Sheet 3

INVENTOR
NIGEL FINCH
By Young & Thompson
ATTORNEYS

United States Patent Office 3,306,673
Patented Feb. 28, 1967

3,306,673
CROP-HANDLING VEHICLES
Nigel Finch, Pinswell, Chedworth, England
(Woodlands, Chedworth, Cheltenham, England)
Filed July 6, 1965, Ser. No. 469,489
Claims priority, application Great Britain, July 6, 1964,
27,702/64
10 Claims. (Cl. 302—37)

This invention relates to vehicles for handling granular materials, and is of particularly advantageous application to vehicles for handling grain crops.

An object of the invention is to provide a vehicle which may take the form of a trailer adapted to be towed behind a combine harvester and to be filled by the latter and thereafter to be coupled directly to and driven by an agricultural tractor for discharge of the grain from the vehicle.

In my prior specification No. 3,173,563 I have described a vehicle for handling cut forage crops, the said vehicle comprising a body for containing a mass of forage, a conveyor forming the floor of the body for moving the forage towards opening means, a further conveyor to receive opened forage discharged by the opening means, and a blower to which the further conveyor delivers the forage and which acts to deliver the forage from the vehicle in an air blast. It is a further object of the present invention to provide a vehicle for handling grain crops which may also include the foregoing elements, whereby to produce a dual-purpose vehicle also capable of handling cut forage crops.

According to one feature of the present invention there is provided a vehicle for handling granular material which comprises a body for containing a mass of material, a floor conveyor for moving the material longitudinally of the vehicle towards transverse conveying means, and a blower to which the conveying means delivers the material and which acts to discharge the material from the vehicle in an air blast, the conveying means being provided with means for preventing material from being blown back into the vehicle, and the body being provided adjacent the forward end of the floor conveyor with adjustable flow control means for controlling the flow of material from the body to the conveying means.

Preferably the means for preventing material from being blown back comprises a fairing having two portions defining therebetween a throat in the form of a slit extending laterally of the body and through which the material flows to the conveying means. The two portions of the fairing may each slope downwardly towards the throat and a deflector plate may be provided below the fairing to deflect material falling through the throat towards the conveying means.

The adjustable flow control means may comprise a vertical gate arranged for vertical adjustment so that the height of the lower end of the gate above the floor conveyor can be varied.

The conveying means may be a further mechanical conveyor or a trough having a base so formed as to deliver the material to the blower inlet. Preferably the conveying means is in the form of a double Archimedean screw having two opposed helical vanes which respectively feed the material in opposite directions towards an intermediate position on the screws defined by the inner ends of the vanes at which position is disposed the blower inlet, and the means provided on the screw for preventing material from being blown back to the vehicle extend laterally on both sides of the inlet and over the latter.

A slat conveyor may be used as the floor conveyor, the slats being carried by a pair of spaced parallel chains mounted on front and rear sprockets and in this case the means such as the fairing provided on the conveying means may be cut away adjacent the front sprockets to allow material to fall directly to the conveying means instead of being carried away rearwardly by the chains, thereby being wasted. Selected slats of the floor conveyor may be provided on their respective undersides with wipers to wipe the upper surface of a fixed floor structure disposed between the upper and lower runs of the conveyor.

According to another feature of the invention there is provided a vehicle for handling granular material which comprises a body for containing a mass of material, a floor conveyor for moving the material longitudinally of the vehicle towards metering means, a further and transverse conveyor to receive a metered quantity of material discharged past the metering means, and a blower to which the further conveyor delivers the material and which acts to deliver the material from the vehicle in an air blast.

The metering means may include a vertical gate arranged in use to be flooded with material so that a substantially constant flow of material through the throat to the further conveyor is maintained.

Preferably, the throat is defined between two portions of a fairing for the further conveyor which extends laterally of the vehicle above the blower inlet.

Figure 2:
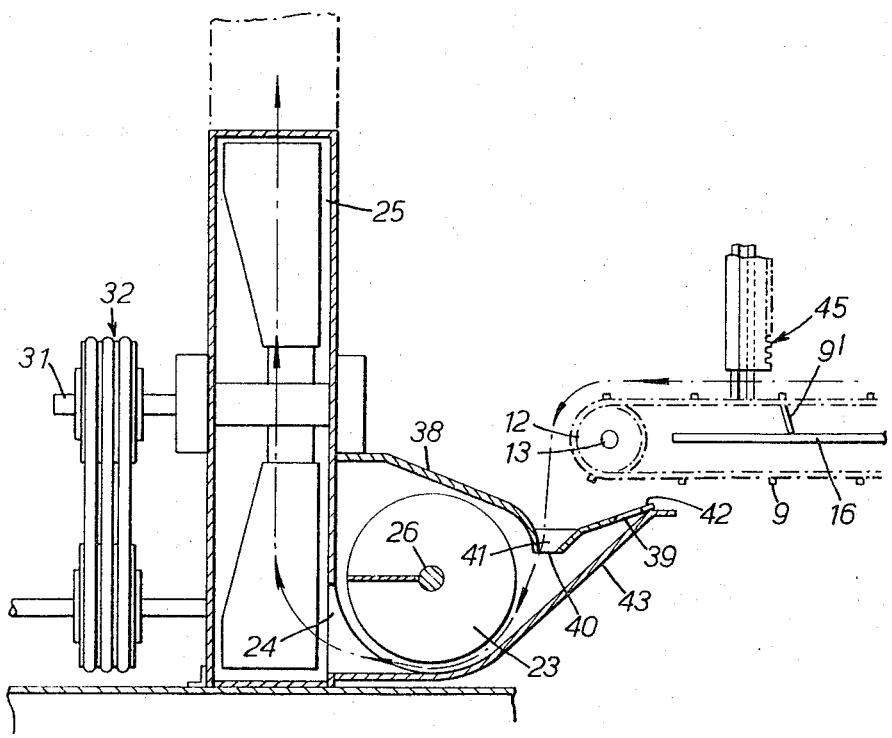
Figure 3:
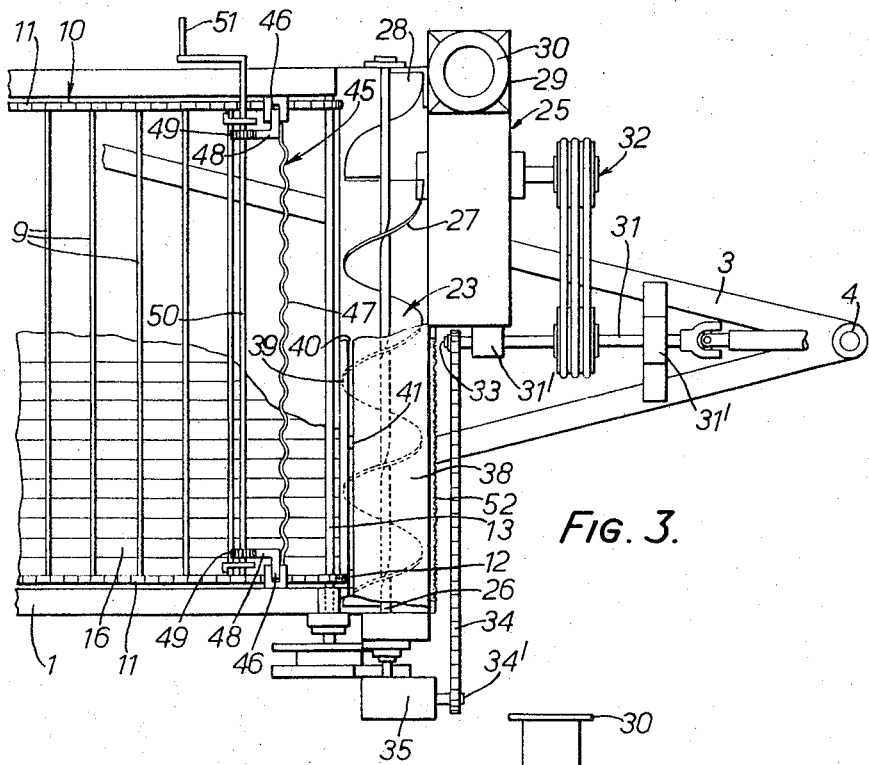
Figure 4:
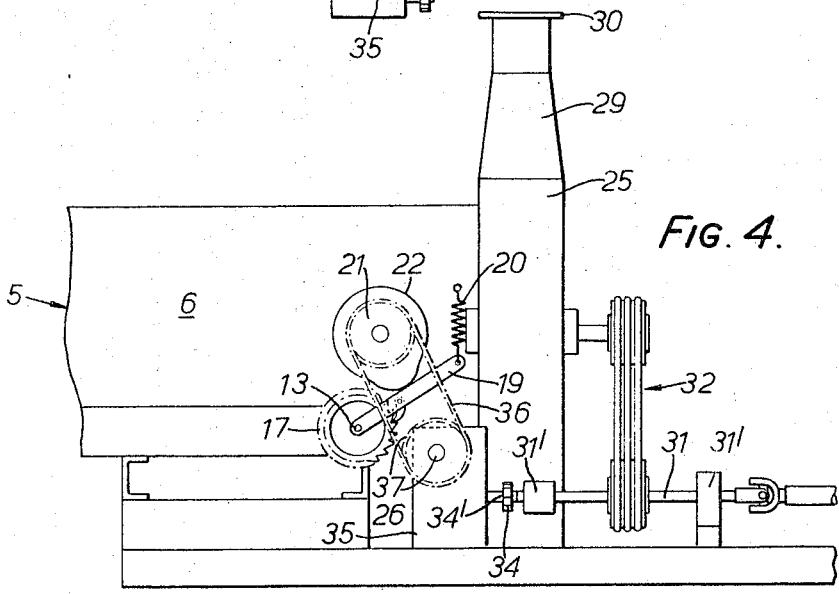

A vehicle in accordance with the invention for handling grain will now be described by way of example with reference to the accompanying drawings, in which:

FIGURE 1 shows somewhat diagrammatically a view from one side of the vehicle, partly broken away and partly in section, FIGURE 2 shows to a larger scale a portion of FIGURE 1, FIGURE 3 is a plan view of the front end of the vehicle with certain parts broken away, and FIGURE 4 is a view from the side of the vehicle opposite to that shown in FIGURE 1, with only the front end of the vehicle shown.

The vehicle comprises a trailer having a rectangular frame 1 which is supported on an axle and wheel set 2. A tow-bar 3 in the form of a triangular frame extends from the forward end of the frame 1, being slightly underslung with respect to the latter so that its forward end is at a suitable height for connection to the draw-bar of an agricultural tractor (not shown). The forward end of the tow-bar 3 is provided at 4 with means for attachment to the draw-bar.

A body 5 having upstanding side walls 6 and a back wall 7 is mounted on the frame 1. The back wall 7 stops short of the floor of the body to provide a gap 8 to allow slats 9 of a slat floor conveyor 10 to pass therethrough.

The floor conveyor 10 is arranged to move grain longitudinally of the vehicle and extends across the full width of the body 5 as do the slats 9 thereof which are supported at respective ends on a pair of spaced parallel endless chains 11. The chains 11 are mounted on front sprockets 12 (FIGURE 3) in turn mounted on a conveyor drive shaft 13, and rear sprockets 14 (FIGURE 1) mounted on an idler shaft 15. The body 5 is provided with a fixed floor structure 16 disposed between the upper end and lower runs of the floor conveyor 10. Strips of rubber 9' are secured to selected ones of the slats 9 on the undersides thereof (as seen on the upper run of the conveyor) to wipe the floor 16.

The floor conveyor 10 is driven intermittently by a pawl and ratchet mechanism 17, 18 and, as shown in FIGURE 4, the ratchet wheel 18 is mounted on the conveyor drive shaft 13 and is operated by the pawl 17 to advance the conveyor. The pawl 17 is mounted on a pawl carrier in the form of a swing arm 19 pivoted adjacent one end to the shaft 13 and attached adjacent the other end to a return spring 20. Attached to the inner face of a drive sprocket 21 is a cam 22 with a single lobe which produces one operative movement of the swing arm 19 for each revolution of the cam.

At the front of the body 5, and below the forward end of the floor conveyor 10, transverse conveying means in the form of a double Archimedean screw 23 extending across the full width of the body and arranged to deliver grain to the inlet 24 (FIGURE 2) of a centrifugal blower 25 mounted at the front of the body. The screw 23 comprises a shaft 26 on which are mounted two opposed helical vanes 27 and 28. In use, the vanes 27 and 28 feed the grain inwardly towards an intermediate position defined by the inner ends of the vanes. The blower 25 is arranged so that said intermediate position on the screw 23 communicates directly with the inlet 24 of the blower. An upwardly extending discharge pipe 29 is provided on the blower 25 and forms a lower discharge chute section which is flanged at the upper end 30 to enable a suitable upper discharge chute (not shown) to be bolted in position. This enables the upper discharge chute section to be chosen to suit the silo or like installation into which it is desired the vehicle should discharge.

The floor conveyor 10, screw 23 and blower 25 are all driven from a single input shaft 31 which is supported in bearings 31' and arranged to be connected to the power-take-off shaft of the tractor. The input shaft 31 drives the blower 25 through a multiple belt arrangement indicated generally at 32, and a sprocket 33 is connected to the shaft adjacent its inner end. An endless chain 34 connects the sprocket 33 in the drive sense with a further sprocket 34' which is secured to the input shaft of a gearbox 35, the output of which is connected to the shaft 26 of the screw 23. Drive to the sprocket 21 carrying the cam 22 is imparted by a chain 36 from a sprocket 37 on the end of the shaft 26.

The screw 23 is provided with a fairing which extends the full width of the screw and comprises a front portion 38 and a rear portion 39 defining therebetween a throat 40 in the form of a slit extending laterally of the body. The width of the throat 40, which may be of the order of 2 inches, is chosen to suit the output of the blower 25 and depends upon the material being handled; it is chosen so that with the throat flooded with grain the screw conveyor 23 and blower are not overloaded and operate close to maximum output. Both the portions 38 and 39 slope downwardly towards the throat 40 so as to guide grain to the latter. The outer end of the rear portion 39 lies beneath the forward end of the floor conveyor 10 so that grain discharged from that end falls on the rear portion and is deflected thereby towards the throat 40. Bridge pieces or fillets 41 are used to connect the front and rear portions 38 and 39 together to form a unitary structure and the corners of the rear edge of the rear portion 39 are cut away at 42 for a purpose to be described. The rear portion 39 is also connected to a curved deflector plate 43 which extends beneath the screw 23 to form a trough in which the screw works and serves to deflect grain towards the screw once the grain has entered the throat 40.

Secured to the rear wall 7 of the body 5 of the vehicle is a panel 44 arranged to slope upwardly and rearwardly at an angle of approximately 20°. The lower end of the panel 44 stops short of the floor conveyor 10 to provide clearance for the slats 9 thereof. If the panel 44 were not provided and the vehicle were fully loaded the grain would tend to run out of the gap 8 in the rear wall 7 due to the normal angle of repose of grain which is about 45°.

Adjacent the forward end of the body 5, although spaced therefrom, is a vertical gate 45 arranged for vertical adjustment. The gate 45 comprises a frame 46 of steel angle section to which is secured corrugated sheeting 47, and a web 48 of the respective angles forming the sides of the frame have teeth cut thereon to form racks for engagement by respective pinions 49 (FIGURE 3). The pinions 49 are secured on a shaft 50 which is manually rotatable by a handle 51 (FIGURE 1). Thus, the gate 45 can be raised or lowered as desired, a pawl and ratchet (not shown) being provided to hold the gate in a raised position. A wire mesh inspection panel 52 is provided at the front end of the vehicle.

In use, the vehicle is filled with grain from a combine harvester, for example, with the gate 45 fully lowered to a position in which it just clears the slats of the floor conveyor and when full the vehicle is towed to the place where the grain is to be discharged. With the gate 45 closed the grain does not pile up on the front and rear portions 38 and 39 of the screw fairing.

When the grain is to be discharged from the vehicle, the power-take-off shaft of the tractor is coupled to the input shaft 31 of the vehicle and the gate 45 then raised slowly by means of the handle 51. Some grain will flow over the forward end of the floor conveyor 10 on to the screw fairing until the normal angle of repose of the grain in front of the gate is reached whereupon little or no further flow of grain will take place. At this point, drive is transmitted to the shaft 31 from the tractor whereupon the blower 25 is operated, together with the screw conveyor 23. Also, drive is imparted to the sprocket 21, and hence the cam 22, to start movement of the floor conveyor 10. In order to clear the grain already fed to the screw conveyor 23 before allowing the floor conveyor 10 to feed further grain thereto, the drive to the floor conveyor can be disconnected by moving the swing arm 19 out of contact with the cam 22. As the floor conveyor 10 is brought into operation the gate 45 is raised to its maximum height.

The slats 9 of the floor conveyor 10 feed grain off the forward end of the conveyor on to the fairing over the screw 23 and the grain flows through the throat 40 in the fairing to the screw 23 which feeds the grain to said intermediate position on the screw and hence to the inlet 24 of the blower 25. The latter rotates in an anticlockwise direction as seen in FIGURE 2 and the undersides of the front and rear portions 38 and 39 of the fairing serve to prevent grain from being blown back into the vehicle or on to the ground. The grain is blown from the inlet 24 to the discharge chute 29 and thence to a further discharge chute, if fitted, and finally to where the grain is required. It will be appreciated that the throat 40 serves to meter the grain flowing to the screw 23 so that a substantially even flow to the latter is maintained.

Although the throat 40 of the fairing serves as metering means, the speed of the floor conveyor can be varied to achieve some measure of control over the quantity of grain which is delivered to the throat. On first starting up, the gate 45 also fulfills a metering function and the initial slow raising of the gate prevents over-flooding of the throat 40.

The cut-away corners 42 of the rear portion 39 of the fairing allow grain to fall on to the plate 43 thereby preventing grain from being trapped and carried rearwardly by the chains 11 with accompanying wastage.

When discharge has been completed, the gate 45 is lowered and the vehicle is ready again for refilling.

When the invention is carried into effect in connection with a special-purpose vehicle, specifically for handling granular material such as grain crops, the sides of the body 5 of the vehicle may be of considerably reduced height as compared with the forage crop handling vehicle described in my prior specification No. 3,173,563.

However, if desired, the vehicle as described with reference to the accompanying drawings may also be provided with the opening means described in my said prior specification whereby a dual-purpose vehicle is provided which can be employed alternatively at will for handling cut forage crops or handling grain crops.

I claim:

1. A vehicle for handling granular material comprising a body for containing a mass of material, a floor conveyor for moving the material longitudinally of the vehicle, transverse conveying means to which the floor conveyor moves the material, a blower to which the transverse conveying means delivers the material and which acts to discharge the material from the vehicle in an air blast, a fairing disposed over the transverse conveyor and blower inlet and between the forward end of the floor conveyor and the blower for preventing material from being blown back into the vehicle and comprising two panels defining therebetween a throat in the form of a slit extending laterally of the vehicle body and through which material flows to the transverse conveying means, both panels being downwardly inclined to said throat, and adjustable flow control means disposed adjacent the forward end of the floor conveyor for controlling the flow of material from the body of the transverse conveying means.

2. A vehicle according to claim 1, wherein a deflector plate is provided below the fairing to deflect material falling through the throat towards the transverse conveying means.

3. A vehicle according to claim 1, wherein the adjustable flow control means comprise a vertical gate, and means for raising and lowering the gate so that the height of the lower end of the gate above the floor conveyor can be varied.

4. A vehicle for handling granular material comprising a body for containing a mass of material, a rear wall for the body having an upwardly and rearwardly inclined panel arranged so that the lower end thereof is spaced above the floor conveyor and also set inwardly from the rear end of the vehicle to prevent escape of material from that end, a floor conveyor for moving the material longitudinally of the vehicle, transverse conveying means to which the floor conveyor moves the material, a blower to which the transverse conveying means delivers the material and which acts to discharge the material from the vehicle in an air blast, a fairing disposed over the transverse conveyor and blower inlet and between the forward end of the floor conveyor and the blower for preventing material from being blown back into the vehicle and comprising two panels defining therebetween a throat in the form of a slit extending laterally of the vehicle body and through which material flows to the transverse conveying means, both panels being downwardly inclined to said throat, and adjustable flow control means disposed adjacent the forward end of the floor conveyor for controlling the flow of material from the body to the transverse conveying means.

5. A vehicle for handling granular material comprising a body for containing a mass of material, a floor slat conveyor for moving the material longitudinally of the vehicle, and comprising a pair of spaced parallel chains, front and rear sprockets on which the chains are mounted, and slats extending between and secured to the pair of chains, transverse conveying means to which the floor conveyor moves the material, a blower to which the transverse conveying means delivers the material and which acts to discharge the material from the vehicle in an air blast, a fairing disposed over the transverse conveyor and blower inlet and between the forward end of the floor conveyor and the blower for preventing material from being blown back into the vehicle and comprising two panels which incline downwardly to a throat in the form of a slit between the panels extending laterally of the vehicle body and through which material flows to the transverse conveying means, one panel being cut away adjacent the respective front sprockets of the floor conveyor to prevent material collecting on that panel and being carried rearwardly by the respective chains and to allow material to fall directly to the transverse conveying means without passing through said throat, and adjustable flow control means disposed adjacent the forward end of the floor conveyor for controlling the flow of material from the body to the transverse conveying means.

6. A vehicle according to claim 5 and further comprising flexible wipers secured to selected slats of the floor conveyor, and a fixed floor structure disposed between the upper and lower runs of the floor conveyor, which floor structure is wiped by said flexible wipers to transfer material which collects on the floor structure to said fairing.

7. A vehicle according to claim 5, wherein the transverse conveyor comprises a trough having a sloping floor portion terminating adjacent the blower inlet.

8. A vehicle according to claim 5, wherein the transverse conveyor comprises a double Archimedean screw having two opposed helical vanes which respectively feed the material in opposite directions towards an intermediate position on the screw defined by the inner ends of the vanes and at which is disposed the blower inlet.

9. A vehicle for handling granular material comprising a body for containing a mass of material, a floor conveyor for moving the material longitudinally of the vehicle, transverse conveying means to which the floor conveyor moves the material, a blower to which the transverse conveying means delivers the material and which acts to discharge the material from the vehicle in an air blast, and metering means in the form of a fairing disposed over the transverse conveyor and blower inlet and between the forward end of the floor conveyor and the blower and comprising two panels defining therebetween a throat in the form of a slit extending laterally of the vehicle body and through which material is metered to the transverse conveying means, both panels being downwardly inclined to said throat.

10. A vehicle according to claim 9 and further comprising an inspection panel disposed at the front end of the vehicle to enable the operator to see whether the transverse conveying means and blower are being overloaded.

References Cited by the Examiner

UNITED STATES PATENTS

| | | | |
|---|---|---|---|
| 2,340,983 | 2/1944 | Pfeiffer et al. | 302—37 |
| 2,421,418 | 6/1947 | Grossman | 302—50 |
| 2,601,608 | 6/1952 | Hansen | 302—50 |
| 3,154,349 | 10/1964 | Wallin et al. | 302—37 |
| 3,173,563 | 3/1965 | Finch | 214—519 |

ANDRES H. NIELSEN, *Primary Examiner.*